(12) United States Patent
Cole et al.

(10) Patent No.: US 8,816,141 B2
(45) Date of Patent: Aug. 26, 2014

(54) REDUCING HYDROGEN CONSUMPTION IN HYDROTREATING OF BIOCOMPONENT FEEDS

(75) Inventors: Kathryn Y. Cole, Easton, PA (US); Patrick L. Hanks, Annandale, NJ (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 870 days.

(21) Appl. No.: 12/861,173

(22) Filed: Aug. 23, 2010

(65) Prior Publication Data

US 2011/0054230 A1 Mar. 3, 2011

Related U.S. Application Data

(60) Provisional application No. 61/275,371, filed on Aug. 28, 2009.

(51) Int. Cl.
*C07C 1/00* (2006.01)

(52) U.S. Cl.
USPC .............................. 585/240; 585/242; 44/605

(58) Field of Classification Search
USPC .............. 585/240, 242; 208/179, 113; 44/605
See application file for complete search history.

(56) References Cited

U.S. PATENT DOCUMENTS

| | | | |
|---|---|---|---|
| 6,156,695 A | 12/2000 | Soled et al. | |
| 6,162,350 A | 12/2000 | Soled et al. | |
| 6,299,760 B1 | 10/2001 | Soled et al. | |
| 6,582,590 B1 | 6/2003 | Riley et al. | |
| 6,712,955 B1 | 3/2004 | Hou et al. | |
| 6,783,663 B1 | 8/2004 | Riley et al. | |
| 6,863,803 B1 | 3/2005 | Riley et al. | |
| 6,929,738 B1 | 8/2005 | Riley et al. | |
| 7,229,548 B2 | 6/2007 | Riley et al. | |
| 7,288,182 B1 | 10/2007 | Soled et al. | |
| 7,410,924 B2 | 8/2008 | Canos et al. | |
| 7,435,335 B1* | 10/2008 | Ellis et al. | 208/210 |
| 7,544,632 B2 | 6/2009 | Soled et al. | |
| 7,781,629 B2* | 8/2010 | Marchand et al. | 585/240 |
| 7,872,165 B2* | 1/2011 | Bertoncini et al. | 585/240 |
| 7,880,043 B2* | 2/2011 | Chapus et al. | 585/240 |
| 8,197,559 B2* | 6/2012 | Abe et al. | 44/398 |
| 8,282,815 B2* | 10/2012 | Bouchy et al. | 208/137 |
| 8,324,439 B2* | 12/2012 | Guillon et al. | 585/240 |
| 2005/0161371 A1 | 7/2005 | Marr et al. | |
| 2005/0277545 A1 | 12/2005 | Shih et al. | |
| 2006/0060502 A1 | 3/2006 | Soled et al. | |

(Continued)

FOREIGN PATENT DOCUMENTS

| | | |
|---|---|---|
| EP | 1 719 811 A1 | 11/2006 |
| EP | 1 741 767 A1 | 1/2007 |

(Continued)

*Primary Examiner* — Nina Bhat
(74) *Attorney, Agent, or Firm* — David M. Weisberg; Chad A. Guice

(57) ABSTRACT

Processes are provided for deoxygenation of a biocomponent feedstock with reduced hydrogen consumption. The biocomponent feedstock can be processed under relatively low hydrogen partial pressures and at a relatively low treat gas ratio compared to the hydrogen need of the feedstock. The relatively low pressure, relatively low treat gas ratio hydroprocessing can result in reduced production of water and carbon monoxide and in increased production of carbon dioxide compared to relatively higher pressure process conditions.

16 Claims, 2 Drawing Sheets

(56) References Cited

U.S. PATENT DOCUMENTS

| | | |
|---|---|---|
| 2007/0084754 A1 | 4/2007 | Soled et al. |
| 2008/0132407 A1 | 6/2008 | Bai et al. |
| 2008/0154073 A1 | 6/2008 | Petri et al. |
| 2008/0161614 A1* | 7/2008 | Bertoncini et al. ........... 585/240 |
| 2008/0161615 A1* | 7/2008 | Chapus et al. ................ 585/240 |
| 2008/0173570 A1 | 7/2008 | Marchand et al. |
| 2008/0300435 A1 | 12/2008 | Cortright et al. |
| 2009/0077867 A1 | 3/2009 | Marker et al. |
| 2009/0193709 A1* | 8/2009 | Marker et al. .................. 44/308 |

FOREIGN PATENT DOCUMENTS

| | | |
|---|---|---|
| WO | 2004/007646 A1 | 1/2004 |
| WO | 2007/084437 A2 | 7/2007 |
| WO | 2007/084438 A2 | 7/2007 |
| WO | 2007/084439 A1 | 7/2007 |
| WO | 2007/084471 A1 | 7/2007 |
| WO | 2008/040980 A1 | 4/2008 |

* cited by examiner

REDUCING HYDROGEN CONSUMPTION IN HYDROTREATING OF BIOCOMPONENT FEEDS

CROSS REFERENCE TO RELATED APPLICATION

This Application claims the benefit of U.S. Application No. 61/275,371, filed Aug. 28, 2009.

FIELD OF THE INVENTION

Processes are provided for hydrotreatment of biocomponent feeds with reduced hydrogen consumption.

BACKGROUND OF THE INVENTION

Fuels based on biocomponent sources will likely become increasingly prevalent in the future. Already, various governments have instituted current and future requirements that motor fuel pools contain a minimum percentage of fuel derived from a biocomponent source, such as a plant, animal, fish, or algae based oil or fat.

For production of diesel fuel, vegetable oils such as canola oil, palm oil, or other similar oils have been identified as potentially suitable based on the carbon chain length of the vegetable oil. However, biocomponent feedstocks are known to often have high hydrogen consumption during hydroprocessing. Providing hydrogen from a separate, outside source in a refinery will often raise costs to a point that is not economical. Thus, when a new process is added in a refinery that requires hydrogen, the addition often requires a reduction in volume in another process. Since biocomponent feeds can have relatively high hydrogen consumption per volume as compared to mineral feeds, multiple barrels of mineral diesel production may have to be removed from service for each added barrel of biocomponent feed. Thus, methods of reducing the needed hydrogen for processing biocomponent feed are desirable.

U.S. Published Patent Application No. 2008/0154073 describes a process for removing oxygen from biocomponent molecules at low hydrogen pressure. The feed is exposed to a supported hydrogenation catalyst, such as Ni, NiMo, Pt, or Pd in the presence of 150-290 psi (1034-1999 kPa) of hydrogen. It appears that the ratio of hydrogen treat gas to feedstock is not disclosed.

U.S. Published Patent Application No. 2008/0161614 describes two-stage co-processing of a feed including both vegetable/animal and mineral oil. The first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

U.S. Published Patent Application No. 2008/0173570 describes a method for hydroprocessing involving two catalyst beds, where a biocomponent feed is introduced in the second bed. It is disclosed that reducing the temperature and the pressure leads to lower hydrogen consumption during removal of oxygen from the biocomponent feed. All of the examples appear to involve a treat gas ratio of 320 Nl/l (1900 scf/bbl).

International Publication No. WO/2008/040980 describes reducing hydrogen consumption by controlling the products from reactions to remove oxygen from biocomponent feeds. Lower hydrogen pressures are mentioned as helping to reduce hydrogen consumption, but such pressures are mentioned as also leading to catalyst deactivation. The examples appear to involve a treat gas ratio of 200 Nl/l (1185 scf/bbl).

European Publication No. EP 1719811 describes a method for producing liquid hydrocarbons from biomass. The method includes forming an aqueous slurry of the biomass and particles of a layered catalyst, such as a clay. The slurry is heated to a temperature between 250 and 400° C. Up to 10 bars (1000 kPa) of hydrogen may optionally be added, although the publication states that it is preferred to perform the process without added hydrogen.

European Publication No. EP 1741767 describes a process for producing diesel fuel from biocomponent sources. EP 1741767 states that the process reduces the needed hydrogen consumption by adding a sulfur-containing compound to the biocomponent feed.

SUMMARY OF THE INVENTION

In an embodiment, a method is provided for reducing hydrogen consumption during deoxygenation of a biocomponent feed. The method includes determining the hydrogen need of a biocomponent feed. The biocomponent feed can be hydrotreated under effective deoxygenation conditions to produce a deoxygenated effluent, including a treat gas ratio between about 80% and 120% of the hydrogen need. The hydrotreatment can be performed in the presence of a catalyst having one or more transition metals supported on a substrate, with the one or more transition metals comprising Co and/or Mo.

DETAILED DESCRIPTION OF THE EMBODIMENTS

Figure 1:
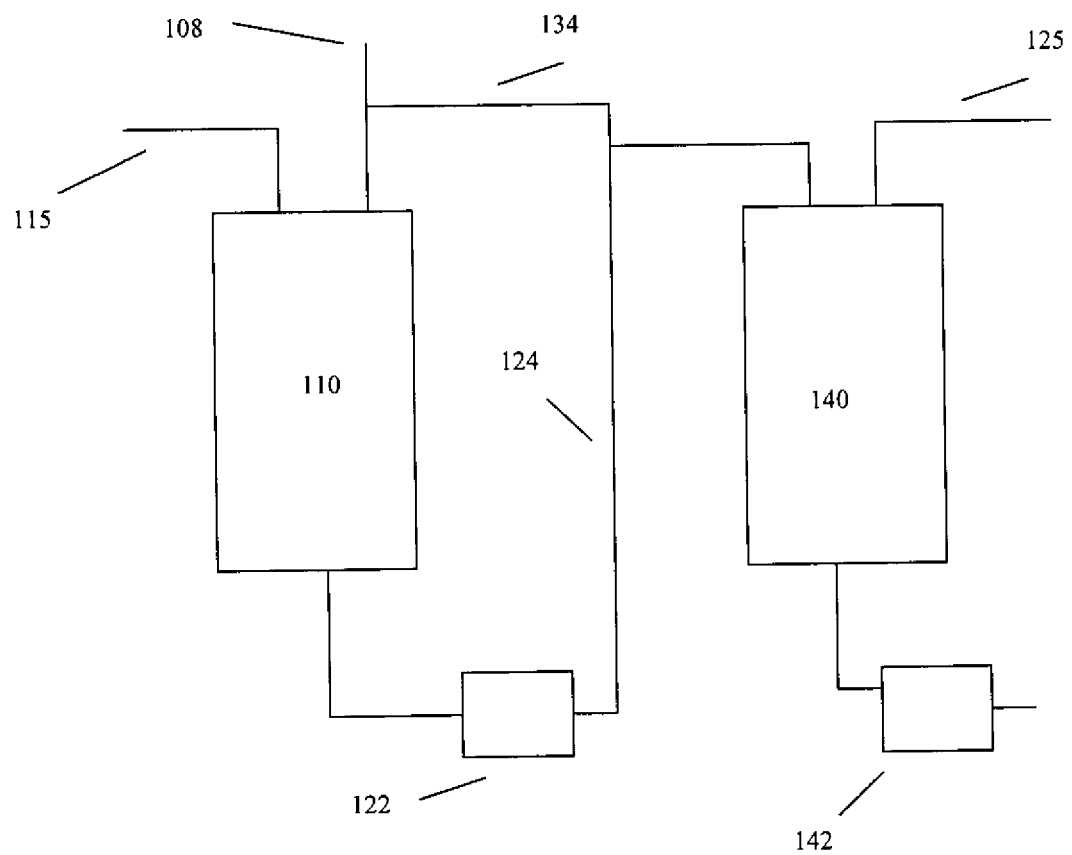
FIG. 1 schematically shows a reaction system for performing a process according to an embodiment of the invention.

In various embodiments, a process is provided that allows for processing of biocomponent feedstocks with reduced hydrogen consumption. The hydrogen consumption can be reduced by using a combination of a reduced treat gas ratio and low hydrogen partial pressure in the presence of a catalyst such as a CoMo catalyst. By using a reduced treat gas ratio, where the ratio of hydrogen in the treat gas relative to the stoichiometric need for the feedstock is near one to one, the apparent amount of hydrogen needed for processing a biocomponent feed can be reduced. In comparison to a method where the partial pressure of hydrogen is reduced to a given value at a high treat gas ratio, the reduction in treat gas ratio can provide a further improvement by inducing more hydrogen production via the water gas shift reaction at the same hydrogen partial pressure. In such embodiments, this can have the corresponding benefit of reducing the amount of carbon monoxide and water that is produced.

In various additional embodiments, a hydroprocessing catalyst with relatively low hydrogenation activity can be used during processing (or co-processing) of a biocomponent feedstock. In such embodiments, the use of a relatively low hydrogenation activity catalyst appears to further reduce production of carbon monoxide. Examples of relatively low hydrogenation activity catalysts can include, but are not limited to, CoMo catalysts and catalysts containing Mo but not a Group VIII metal.

The treat gas ratio is defined herein as the volume of hydrogen entering a reaction system during a given time period relative to the volume of feedstock. The hydrogen flow rate is expressed as the volume under a standard temperature of 15° C. and pressure of 14.7 psia (101 kPaa). This allows the hydrogen volume to be specified independent of the pressure in the reaction system. Note that the treat gas ratio is based on the volume of hydrogen, as opposed to the total volume of gas entering a reaction system. If hydrogen is provided as part of a gas flow that contains other gases, such as nitrogen, the hydrogen volume represents the portion of the total gas flow that is attributable to the hydrogen. Thus, if a gas stream containing 90% hydrogen by volume is used as the hydrogen source, the hydrogen volume used to determine the treat gas ratio will be 90% of the total gas volume.

In conventional hydrotreatment of a diesel boiling range feed, the ratio of amount of hydrogen delivered to a reactor versus the flow rate of the feed is typically much greater than the amount necessary to replace the hydrogen consumed by the feed. Typical treat gas ratios involve a hydrogen flow rate that is at least three to four times (or more) larger than the needed hydrogen based on the feed rate. The needed hydrogen can be determined based on a prior experiment using an excess of hydrogen (preferably a relatively large excess, such as three times or more compared to the stoichiometric need), or the needed hydrogen can be determined stoichiometrically. Conventionally, this excess hydrogen was believed to be necessary in order to efficiently process a feedstock. An example of this conventional understanding for hydrogen treat gas ratio is shown in a paper presented at the 2004 National Petroleum Refiners Association (NPRA) conference by Process Dynamics Incorporated. In the Process Dynamics presentation, it is noted that the treat gas ratio should typically allow for three to four times as much hydrogen as the expected consumption. Other publications have stated that the treat gas ratio should be four to five times expected consumption.

It is noted that many general descriptions of hydrotreatment processes have broad ranges for the treat gas ratio. These broad ranges reflect the widely varying stoichiometric needs of various feeds. The treat gas ratio is typically expressed as the amount of hydrogen relative to the total amount of feed (such as scf/bbl or NL/L). For example, a feed with less than 0.5 wt % sulfur content and no aromatics would have a hydrogen need of only a few tens of scf/bbl, while a feed with a substantial aromatics content than needed saturation could require several hundred scf/bbl. Thus, disclosure of a broad range of hydrogen treat gas ratios, by itself, provides little insight regarding the question of how the amount of hydrogen provided to a specific feed should relate to that specific feed's hydrogen consumption.

It is noted that oxygen can be removed with little or no hydrogen consumption under some removal mechanisms, which could create an ambiguity in the hydrogen need under some definitions. In order to avoid this ambiguity, if the hydrogen need is determined stoichiometrically, the hydrogen need should be defined to include the amount of hydrogen needed to remove any oxygen in the feed by a hydrodeoxygenation mechanism. This can be referred to as the stoichiometric hydrodeoxygenation hydrogen need for a feedstock. Of course, hydrogen needed for sulfur removal, olefin saturation, and other typical hydrogen requirements during hydrotreatment are also included in the stoichiometric hydrodeoxygenation hydrogen need.

While hydrotreatment is an effective way to deoxygenate a biocomponent feedstock, such feedstocks can have much larger hydrogen consumption requirements as compared to a similar boiling range mineral feedstocks. For example, due to high oxygen and olefin contents, a biocomponent feed can require about 1500 scf/bbl (about 250 $Nm^3/m^3$) or more of hydrogen in order to both saturate and deoxygenate the feed. Thus, hydroprocessing of one barrel of diesel range biocomponent feedstock under conventional conditions can often require the same amount of hydrogen as five to seven barrels (or more) of a typical mineral diesel feed.

Hydroprocessing of biocomponent feedstocks can also produce additional waste byproducts that normally are present only at minimal levels in hydroprocessing of a mineral feed. For example, deoxygenation of a biocomponent feed in an excess of hydrogen can primarily lead to removal of oxygen as water. Since biocomponent feeds can have as much as about 10 wt % to about 12 wt % oxygen content, a substantial amount of water can be produced by deoxygenation. Some oxygen can also be removed as carbon oxides, such as carbon dioxide and/or carbon monoxide. The carbon monoxide poses a particular problem during biocomponent processing, as carbon monoxide is not removed by typical scrubbers used for refinery hydrogen loops. When a mineral feedstock is processed using a relatively high hydrogen treat gas ratio (in large excess compared to the stoichiometric need), the excess hydrogen can be recycled, which can somewhat mitigate the need for the higher hydrogen demand such a treat gas ratio would normally implicate. The carbon monoxide generated during processing of a biocomponent feed can make it more difficult to recycle such excess hydrogen.

One method for reducing hydrogen consumption has been to operate at lower partial pressures of hydrogen. This tactic is believed to modify the pathway by which a biocomponent feed is deoxygenated. By reducing the available hydrogen, more oxygen is believed to be removed by competing pathways where oxygen leaves as carbon dioxide, rather than as water. However, such methods still employ relatively large ratios of hydrogen treat gas to feedstock.

With regard to products, low pressure hydrotreatment of a biocomponent feedstock can lead to a decreased amount of water, an increase in carbon dioxide, and an increase in carbon monoxide, relative to a higher pressure process. A more detailed analysis of the carbon chains in the product would likely show a slight decrease in average chain length for the low pressure case, due to the carbon atoms that are incorporated into the increased amounts of carbon oxides.

Hydrotreatment of a biocomponent feed at both relatively low pressure and a relatively low treat gas ratio can provide several advantages over conventional methods. Processing at low pressure can achieve the benefits of removing oxygen with reduced hydrogen consumption, as described above. By also using a relatively low treat gas ratio, the apparent hydrogen consumption can be further reduced. The apparent hydrogen consumption is believed to be further reduced by facilitating the water gas shift reaction, which converts water and carbon monoxide into hydrogen and carbon dioxide. The equilibrium water gas shift reaction can be written as: $H_2O + CO \leftrightarrows H_2 + CO_2$.

Since the water gas shift reaction approximates an equilibrium process, a surplus of one of the components can tend to drive the reaction toward consumption of that component. Similarly, the equilibrium can tend to favor formation of a component that is present in small quantities relative to the other components. Without being bound by any particular theory, it is believed that providing both a low hydrogen partial pressure and a low treat gas ratio can create conditions favorable for formation of hydrogen using the water gas shift reaction. As hydrogen is formed by the reaction, carbon dioxide can also be formed while water and carbon monoxide are consumed. Aside from removing a relatively large water formation issue, this can also lead to reduced levels of carbon monoxide, which can be particularly beneficial, as carbon monoxide can be somewhat difficult to remove from a hydrogen containing stream.

In the discussion below, a biocomponent feedstock refers to a hydrocarbon feedstock derived from a biological raw material component, such as vegetable fats/oils or animal fats/oils (including fish and algae fats/oils). Note that for the purposes of this document, vegetable fats/oils refer generally to any plant based material, and include fat/oils derived from a source such as plants from the genus Jatropha. The vegetable oils, animal fats, and algae fats/oils that can be used in the present invention can advantageously include any of those which comprise triglycerides and/or free fatty acids (FFA). The triglycerides and FFAs typically contain aliphatic hydrocarbon chains in their structure having from 8 to 36 carbons, preferably from 10 to 26 carbons, for example from 14 to 22 carbons. Other types of feed that are derived from biological raw material components include fatty acid esters, such as fatty acid alkyl esters (e.g., FAME and/or FAEE). Examples of biocomponent feedstocks include but are not limited to rapeseed (canola) oil, peanut oil, sunflower oil, tall oil, corn oil, soy oils, castor oil, jatropha oil, jojoba oil, olive oil, flaxseed oil, palm oil, and the like, and combinations thereof.

Biocomponent based diesel boiling range feedstreams can typically have low nitrogen and sulfur content. For example, a biocomponent based feedstream can contain up to about 300 parts per million by weight (wppm) nitrogen (in the form of nitrogen-containing compounds). Instead of nitrogen and/or sulfur, the primary heteroatom component in biocomponent based feeds is typically oxygen (in the form of oxygen-containing compounds). Suitable biocomponent diesel boiling range feedstreams can include up to about 10-12 wt % oxygen. In preferred embodiments, the sulfur content of the biocomponent feedstream can advantageously be about 15 wppm or less, preferably about 10 wppm or less, although, in some embodiments, the biocomponent feedstream can be substantially free of sulfur (e.g., can contain no more than 50 wppm, preferably no more than 20 wppm, for example no more than 15 wppm, no more than 10 wppm, no more than 5 wppm, no more than 3 wppm, no more than 2 wppm, no more than 1 wppm, no more than 500 wppb, no more than 200 wppb, no more than 100 wppb, no more than 50 wppb, or completely no measurable sulfur).

In some embodiments, a biocomponent feedstream can be mixed with a mineral diesel boiling range feedstream for co-processing. In other embodiments, a diesel boiling range product from hydrotreatment of a biocomponent feedstock can be mixed with a mineral feed for further processing. In such embodiments, the mineral feedstream can have a boiling range from about 150° C. to about 400° C., for example from about 175° C. to about 350° C. Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. In some embodiments, the mineral stream for blending with the biocomponent stream can be a diesel boiling range stream. In other embodiments, the mineral stream can be a higher boiling stream, such as an atmospheric or vacuum gas oil. In still other embodiments, the mineral stream can be a lighter boiling stream, such as a heavy naphtha, a catalytically cracked feed or product (e.g., for/ from FCC), and/or a virgin naphtha stream. Other examples of suitable mineral streams can include resid, cycle oils, and coker derived oils, as well as combinations of any of these and/or any of the other aforementioned streams.

In some embodiments of the invention, the feed to the low pressure, low treat gas ratio hydrotreatment process can include both feeds from biocomponent sources, such as vegetable and/or animal sources, and feeds from mineral sources. In such embodiments, the feed can contain at least about 10 wt % of biocomponent feedstock, for example at least about 25 wt % or at least about 50 wt %. In such embodiments, the feed can contain about 95 wt % or less of biocomponent feed, for example about 90 wt % or less, about 75 wt % or less, or about 50 wt % or less.

The feed can include varying amounts of feedstreams based on biocomponent sources, such as vegetable oils, animal fats, fish oils, algae oils or fats, pyrolysis oils, or the like, or combinations or derivatives thereof. For example, the feed may, in some embodiments include a feedstream derived from a biocomponent source, such as from a vegetable oil or an algae oil, e.g., where a carboxylic acid alkyl ester (typically having from 8 to 36 carbons attached to the carboxylate carbon, preferably from 10 to 26 carbons, for example from 14 to 22 carbons; also typically having from 1 to 24 carbons attached via an ester bond to the carboxylate moiety, preferably from 1 to 18 carbons, more preferably from 1 to 12 carbons, for example from 1 to 8 carbons).

In some embodiments, a biocomponent feed can be selected that includes a challenged biocomponent feed, such as animal fat, a crude vegetable oil, an algae oil or fat, a vegetable oil, a pyrolysis oil, or a derivative and/or combination thereof, with only minimal pre-processing. In embodiments where only a portion of the biocomponent feed is a challenged biocomponent feed, the feed can include at least about 10% by weight, for example at least about 20% by weight or at least about 30% by weight of the challenged biocomponent feed. In other embodiments, the biocomponent feed can include about 90% or less by weight, for example about 75% or less by weight, or about 50% or less by weight, of the challenged biocomponent feed.

In various embodiments, a feedstock can be introduced into a first hydrotreatment reactor that includes one or more catalyst beds that contain a hydrotreatment catalyst. The feedstock can be a biocomponent feed, or the feedstock can be a mixture of biocomponent and mineral feed. The feedstock can be exposed to each catalyst bed under conditions sufficient for hydrodesulfurization and hydrodeoxygenation to occur. Such conditions can also result in saturation of olefins present in the biocomponent feedstock.

In some embodiments, the first hydrotreatment reactor can include a recycle loop for recycling a portion of the liquid effluent from the reactor. In such embodiments, recycling of a portion of the product can assist in maintaining temperature control in the reactor. The amount of product recycle can be from about 5% to about 95% of the total liquid effluent by volume. The amount of product recycle can be at least about 20%, for example at least about 30% or at least about 50%, of the liquid effluent by volume. The amount of product recycle can be about 90% or less, for example about 75% or less or about 60% or less, of the liquid effluent by volume. In a preferred embodiment, the amount of product recycle includes about 50% to about 90% of the liquid effluent by volume.

The catalyst in the first hydrotreatment reactor can be a hydrotreatment catalyst with a relatively low hydrogenation activity. One example of a catalyst with a low hydrogenation activity is a catalyst including cobalt and molybdenum on a suitable support. Suitable supports can include, but are not limited to, silica, silica-alumina, alumina, and titania. In another embodiment, a catalyst may contain metals consisting essentially of cobalt and molybdenum on a suitable support. As another example, in some embodiments there may be a lower need to reduce the sulfur concentration of a feed. For example, a feed that is composed entirely of a biocomponent feed may already have a sulfur level below a desired standard, or such a feed may be combined with a previously hydroprocessed mineral feed to provide a feed that needs little or no further desulfurization. Alternatively, a second hydrotreatment stage can be present, so that the amount of hydrodesulfurization that occurs in the first hydrotreatment stage is not critical. In such embodiments, a catalyst consisting essentially of a Group VIB metal without a Group VIII metal may have sufficient activity for hydroprocessing a feed. Preferably, the Group VIB metal can be molybdenum. For the purposes of the above embodiments, the term "consisting essentially of" is used to refer to catalysts that include the identified transition metals, but exclude other transition metals. Although the hydrotreatment catalysts mentioned herein are disclosed to contain certain transition metals (e.g., in oxide form, or preferably after the oxide form has been sulfidized under appropriate sulfidization conditions), optionally on a support, the catalyst may additionally or alternately contain additional components, such as other transition metals (e.g., Group V metals such as niobium), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof.

The reaction conditions in the first hydrotreatment reactor can be conditions suitable for deoxygenating the feedstream and optionally but preferably also for saturating olefins. In various embodiments, the reaction conditions can include an LHSV of about 0.3 to 4.0 $hr^{-1}$, preferably about 0.5 to 2.0 $hr^{-1}$. The hydrogen partial pressure can be at least about 20 psia (about 140 kPaa), for example at least about 25 psia (about 170 kPaa), at least about 50 psia (about 350 kPaa), or at least about 100 psia (about 690 kPaa). Alternatively, the hydrogen partial pressure can be about 500 psia (3.4 MPaa) or less, for example about 350 psia (about 2.4 MPaa) or less, about 250 psia (about 1.7 MPaa) or less, or about 175 psia (about 1.2 MPaa) or less. In various embodiments, a hydrogen partial pressure in the reactor can be from about 20 psia to about 500 psia (about 140 kPaa to about 3.4 MPaa), preferably from about 25 psia to about 175 psia (about 170 kPaa to about 1.2 MPaa). The treat gas ratio can be at least about 300 scf/bbl (about 51 $Nm^3/m^3$), for example at least about 400 scf/bbl (about 67 $Nm^3/m^3$) or at least about 500 scf/bbl (about 84 $Nm^3/m^3$). Alternatively, the treat gas ratio can be about 900 scf/bbl (about 150 $Nm^3/m^3$) or less, for example about 800 scf/bbl (about 130 $Nm^3/m^3$) or less or about 750 scf/bbl (about 130 $Nm^3/m^3$) or less. In various embodiments, the treat gas ratio can be from about 300 scf/bbl to about 900 scf/bbl (about 51 $Nm^3/m^3$ to about 150 $Nm^3/m^3$) of hydrogen, preferably from about 550 to 750 scf/bbl (about 93 $Nm^3/m^3$ to about 130 $Nm^3/m^3$). The temperature can be from about 280° C. to about 380° C., preferably from about 300° C. to about 360° C.

An alternative way to express the treat gas ratio is relative to the hydrogen need of the feed. In an embodiment, the treat gas ratio can be at least about 80% of the hydrogen need, for example at least about 90%, at least about 95%, or at least about 100%. In another embodiment, the treat gas ratio can be about 130% or less of the hydrogen need, for example about 120% or less, about 110% or less, about 100% or less, or about 95% or less.

If the feedstock is a mixture of a biocomponent feed and a mineral feed, the reaction conditions in the first hydrotreatment reactor can be conditions suitable for reducing the sulfur content of the feedstream while also deoxygenating the feedstream (and optionally but preferably also saturating olefins) as the feedstream is exposed to the catalyst bed(s) in the reactor. Preferably, the hydrotreatment catalyst can be composed of cobalt and molybdenum (e.g., either in oxide form, or as at least partially sulfided) on a suitable support. In a preferred embodiment, the reaction conditions of the first hydrotreatment reactor can be selected to perform a thorough hydrodeoxygenation (e.g., to attain no more than about 300 wppm oxygen in the hydrotreated product, preferably no more than about 100 wppm oxygen) while reducing the sulfur content of the feedstock, e.g., to a value between about 800 wppm and 1500 wppm S. Alternatively, the reaction conditions in the first hydrotreatment reactor can be selected to reduce the sulfur content to between about 100 wppm and 200 wppm S. In still other embodiments, the sulfur content can be reduced to about 1500 wppm or less, for example about 1000 wppm or less, about 500 wppm or less, or about 200 wppm or less. Although it is desirable to reduce the sulfur content as low as possible, some sulfur can remain in the hydrotreated effluent, e.g., about 100 wppm or more, for example about 200 wppm or more or about 500 wppm or more.

In another embodiment, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent (e.g., to remove metals), filtering the biocomponent portion (e.g., to remove sediment), or other processes. Alternatively, an optional metals removal pretreatment can take place in a first reactor after mixing of the biocomponent and mineral hydrocarbon feeds, by exposing the combined feedstock to a demetallization catalyst under demetallization conditions prior to hydrodesulfurization and/or hydrodeoxygenation.

After hydrotreatment, the hydrotreated feed can be passed to a separator to remove gas phase products (e.g., such as $H_2S$, CO, $CO_2$, and/or $NH_3$) from the diesel boiling range product. The diesel range boiling product can be added directly to the diesel fuel pool, or it can undergo further processing. Optionally, the diesel boiling range product can be mixed with another diesel boiling range feed prior to further processing. In embodiments where the initial feed can be a mixture of biocomponent and mineral feeds, it can be preferable to hydrotreat the diesel boiling range product in a second hydrotreatment stage to satisfy a desired sulfur content specification.

If further processing is desirable, one option can be to perform a second hydrotreatment on the diesel boiling range product. In such embodiments, the second hydrotreatment reactor can include one or more catalyst beds containing a hydrotreating catalyst. The diesel range compounds can contact the hydrotreating catalyst in the second hydrotreatment reactor under hydrodesulfurization conditions. The output stream from the second hydrotreatment reactor can be a diesel fuel with an improved cetane number (relative to the cetane number obtained from only a first hydrotreatment reaction) and a sulfur content of about 15 wppm or less, for example about 10 wppm or less.

The catalyst in the second hydrotreatment reactor can be a catalyst containing transition metals comprising a Group VIB metal and/or a Group VIII metal, optionally on a support. Suitable metals can include, but are not limited to, nickel, molybdenum, tungsten, or combinations thereof. Suitable supports can include, but are not limited to, silica, silica-alumina, alumina, and titania. The catalyst in the second hydrotreatment reactor can preferably exhibit, in comparison to the catalyst in the first hydrotreatment reactor, a higher catalytic activity for hydrogen-based heteroatom removal and/or bond saturation, a lower tolerance for catalytic deactivation/poisoning from compounds present in diesel boiling range streams, or both. While the catalyst in the second hydrotreatment reactor can contain transition metals consisting essentially of a Group VIB metal and/or a Group VIII metal, optionally on a support, the catalyst may additionally or alternately contain additional components, such as other transition metals (e.g., Group V metals such as niobium), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof. By way of illustration, catalysts comprising a Group VIB metal and a Group VIII metal (e.g., in oxide form, or preferably after the oxide form has been sulfidized under appropriate sulfidization conditions), optionally on a support, are described, for example, in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia.

The reaction conditions in the second hydrotreatment reactor can be conditions suitable for reducing the sulfur content of the feedstream to about 15 wppm or less, for example about 10 wppm or less, as the feedstream is exposed to the catalyst beds in the reaction zone. The reaction conditions can include an LHSV from about 0.5 $hr^{-1}$ to about 1.5 $hr^{-1}$, a total pressure from about 250 psia to about 800 psia (about 1.7 MPaa to about 5.5 MPaa), and a temperature from about 550° F. to about 750° F. (about 288° C. to about 399° C.). In one particular embodiment, the reaction conditions include an LHSV from about 0.9 $hr^{-1}$ to about 1.1 $hr^{-1}$, a total pressure from about 350 psig to about 600 psig (about 2.4 MPag to about 4.1 MPag), a hydrogen treat gas rate from about 950 scf/bbl to about 1050 scf/bbl (about 160 $Nm^3/m^3$ to about 180 $Nm^3/m^3$) of at least about 95% hydrogen (remainder inert gas), and a temperature from about 625° F. to about 675° F. (about 329° C. to about 357° C.).

The product from the second hydrotreatment reactor can undergo one or more of a variety of additional process steps. Optionally, the product from the second reactor can be separated into a gas phase product and a liquid phase product using a separator. The gas phase product from the separator can be recycled for further use, e.g., in the second hydrotreating reactor. After separation, the liquid phase (or if no separation is conducted, merely the) product from the second hydrotreating reactor can be exposed to a hydroisomerization catalyst under hydroisomerization conditions, e.g., to further improve the cold-flow properties of the (liquid phase) product stream. Optionally, before such a hydroisomerization step, the (liquid phase) product can be passed through a liquid treatment step, such as by exposing the liquid to filtration, a caustic solution wash, or a treatment with chemical agents to remove sulfur and trace contaminants. Additionally or alternately, the (liquid phase) product can be passed through a sulfur adsorption step, such as by exposing the liquid stream to metallic Ni, ZnO, or another adsorber of sulfur species. In another optional embodiment, the hydrotreated feed can be blended with a feed containing fatty acid alkyl esters (such as FAME and/or FAEE), to further increase the amount of biocomponent.

In the optional hydroisomerization stage, hydroisomerization catalysts can suitably include molecular sieves such as crystalline aluminosilicates (zeolites) or silicoaluminophosphates (SAPOs). These catalysts may also carry a metal hydrogenation component, preferably one or more Group VIII metals, especially one or more Group VIII noble metals. Dewaxing conditions can include temperatures of about 250° C. to about 450° C., preferably about 280° C. to about 380° C., pressures of about 300 psig to about 3000 psig (about 2.1 MPag to about 20.7 MPag), LHSV values of about 0.1 $hr^{-1}$ to about 5.0 $hr^{-1}$, and treat gas ratios of about 500 scf/bbl to about 5000 scf/bbl (about 84 $Nm^3/m^3$ to about 840 $Nm^3/m^3$).

In various embodiments, the molecular sieve used for catalytic dewaxing can comprise an aluminosilicate, e.g., having an MRE framework zeolite such as ZSM-48, which is a 10-membered ring molecular sieve having a 1-D channel structure. ZSM-48-type molecular sieves can perform dewaxing primarily by isomerizing molecules within the feed. Typical silica to alumina ratios for the aluminosilicate can be from about 250 to 1 or less, or from 200 to 1. Preferably, the silica to alumina ratio of the aluminosilicate can be less than about 110 to 1, for example less than about 110 to about 20 or from about 100 to about 40. To form a catalyst, the molecular sieve can be composited with a binder. Suitable binders can include, but are not limited to silica, alumina, silica-alumina, titania, zirconia, or a mixture thereof. Other suitable binders will be apparent to those of skill in the art.

A reaction system suitable for carrying out the above processes is shown schematically in FIG. 1. In FIG. 1, a biocomponent feedstock 108 can be introduced into a first hydrotreatment reactor 110. Optionally, the feedstock 108 can also include a mineral portion of the feed. A hydrogen treat gas stream 115 can also be introduced into hydrotreatment reactor 110. The combined feedstock can be exposed to hydrotreating conditions in first hydrotreatment reactor 110 in the presence of one or more catalyst beds that contain hydrotreating catalyst. The treated feedstock can flow into a separator 122. Separator 122 can separate a diesel boiling range product 124 from gaseous contaminants, such as $H_2S$, CO, $CO_2$, or $NH_3$, that may be present after the first hydrotreatment stage. In the embodiment shown in FIG. 1, a portion 134 of the diesel boiling range product is recycled.

After passing through first hydrotreatment reactor 110 and optionally separator 122, the diesel boiling range product can optionally enter a second hydroprocessing reactor 140, along with a second hydrogen treat gas stream 125. The optional second hydroprocessing reactor 140 can be a hydrotreatment reactor, a hydroisomerization reactor, or another desired hydroprocessing reactor. Optionally, the treated feedstock can then pass through a separator 142 for separating gas and liquid products.

The liquid product from either the first or the second reactor can undergo a variety of additional process steps. Optionally, the liquid stream can be passed through a liquid treatment step, such as by exposing the liquid to filtration, a caustic solution wash, or a treatment with chemical agents to remove sulfur and trace contaminants. Alternatively, the liquid stream can be passed through a sulfur adsorption step, such as by exposing the liquid stream to metallic Ni, ZnO, or another adsorber of sulfur species. In still another embodiment, where the optional hydroprocessing reactor is a second hydrotreatment reactor, the liquid product from the second hydrotreatment stage can be passed to a hydroisomerization stage.

Additionally or alternately, the present invention includes the following embodiments.

Embodiment 1

A method for reducing hydrogen consumption during deoxygenation of a biocomponent feed, comprising: determining the hydrogen need of a biocomponent feed; and hydrotreating the biocomponent feed under effective deoxygenation conditions to produce a deoxygenated effluent, including a treat gas ratio between about 80% and 120% of the hydrogen need, wherein the hydrotreatment is performed in the presence of a catalyst having one or more transition metals supported on a substrate, the one or more transition metals comprising Co, Mo, or a combination thereof.

Embodiment 2

The method of embodiment 1, wherein the effective deoxygenation conditions further comprise a hydrogen partial pressure of about 20 psia to about 350 psia (about 140 kPaa to about 2.4 MPaa), a temperature of about 280° C. to about 380° C., and an LHSV of about 0.3 hr$^{-1}$ to about 4 hr$^{-1}$.

Embodiment 3

The method of embodiment 1 or embodiment 2, wherein the treat gas ratio is from about 300 scf/bbl to about 900 scf/bbl (about 50 Nm$^3$/m$^3$ to about 150 Nm$^3$/m$^3$).

Embodiment 4

The method of any of the previous embodiments, wherein the catalyst consists essentially of one or more transition metals selected from Co, Mo, and a combination thereof, supported on a substrate.

Embodiment 5

The method of any of the previous embodiments, wherein the support comprises silica, alumina, silica-alumina, or titania.

Embodiment 6

The method of any of the previous embodiments, further comprising recycling a portion of the deoxygenated effluent, wherein the biocomponent feed comprises from about 20 wt % to about 95 wt % recycled feed.

Embodiment 7

The method of embodiment 6, wherein the biocomponent feed comprises from about 50 wt % to about 90 wt % recycled feed.

Embodiment 8

The method of any of the previous embodiments, wherein the hydrogen need is a stoichiometric hydrodeoxygenation hydrogen need.

Embodiment 9

The method of any of the previous embodiments, wherein the biocomponent feedstock further comprises about 5 wt % to about 80% by weight of a mineral feed.

Embodiment 10

The method of embodiment 9, wherein the mineral feed is a diesel boiling range mineral feed.

Embodiment 11

The method of any of previous embodiments, wherein the treat gas ratio is about 110% or less of the hydrogen need.

Embodiment 12

The method of embodiment 11, wherein the treat gas ratio is about 100% or less of the hydrogen need.

Embodiment 13

The method of any of the previous embodiments, further comprising: separating the deoxygenated effluent to form a gas phase product and a diesel boiling product; and hydroisomerizing the diesel boiling range product under effective hydroisomerization conditions.

Embodiment 14

The method of any of the previous embodiments, further comprising: separating the deoxygenated effluent to form a gas phase product and a diesel boiling product; and hydrotreating the diesel boiling range product under effective hydrotreatment conditions.

Embodiment 15

The method of embodiment 14, further comprising hydroisomerizing the diesel boiling range product under effective hydroisomerization conditions.

EXAMPLES

Example 1

Co-Processing of Soybean Oil and Mineral Feed

A mixture of a biocomponent diesel feed and a mineral diesel feed were co-processed under hydrotreatment conditions. The feed included about 30% by weight of soybean oil. Published reports indicate that the expected hydrogen consumption for hydrodeoxygenation and olefin saturation of soybean oil is between about 1500-1900 scf/bbl (about 250-320 Nm$^3$/m$^3$). Based on this, about 1700 scf/bbl (about 303 Nm$^3$/m$^3$) was selected as an expected hydrogen consumption for the soybean oil portion of the feed. The remaining 70 wt % of the feed was a mineral feedstock corresponding roughly in boiling range to a light gasoil. The expected hydrogen consumption for this mineral light gasoil portion of the feed was about 100 scf/bbl (about 17 Nm$^3$/m$^3$). Because the feed was about 30 wt % soybean oil and about 70 wt % mineral light gas oil, the expected hydrogen consumption for the blended feed was calculated to be about 580 scf/bbl (about 98 Nm$^3$/m$^3$).

The 30/70 soybean/mineral oil feed mixture was processed in the presence of a CoMo catalyst under two sets of conditions where the treat gas ratio is lower than the typically recommended ratio. The first set of conditions included a process temperature of about 625° F. (about 329° C.), an $H_2$ partial pressure of about 320 psig (about 2.2 MPag), a total treat gas ratio of about 1450 scf/bbl (about 244 $Nm^3/m^3$) of about 80% $H_2$, corresponding to a hydrogen treat gas ratio of about 1160 scf/bbl (about 193 $Nm^3/m^3$), and an LHSV of about 0.6 $hr^{-1}$. The hydrogen treat gas ratio in the first set of conditions is approximately two times the expected hydrogen consumption for the mixed feed. In the second set of conditions, the treat gas ratio was reduced to about 780 scf/bbl for total gas (about 620 scf/bbl of $H_2$), which is less than about 110% of the hydrogen need. The target $H_2$ partial pressure was also about 320 psig (about 2.2 MPag), but due to natural process variations, a partial pressure of about 311 psig (about 2.1 MPag) was measured at the reactor outlet. This is believed to be close enough to the desired pressure of about 320 psig (about 2.2 MPag) to have minimal or no impact on the results or conclusions drawn therefrom.

The soybean oil contained roughly 10 wt % of oxygen. Because the feed was about 30 wt % soybean oil, the total feedstock contained about 3 wt % oxygen. Under the reaction conditions, at least about 98% of triglycerides in the feed were subject to deoxygenation. The oxygen content remaining in the feed was less than about 0.1 wt %, which includes oxygen gas dissolved in the feed. This level of oxygen removal is believed to be sufficient for diesel fuel applications.

The characteristics of the effluent from these two runs are shown in Table 1. In Table 1, the yield columns for CO, $CO_2$, and $H_2O$ include two numbers. The first number represents the measured yield, while the second number shows the corresponding yield if the feed had been 100% soybean oil. Table 1 shows that reducing the treat gas ratio also resulted in a lower hydrogen consumption for the soybean oil. Table 1 also shows that decreasing the treat gas ratio resulted in a decrease in the yield of $H_2O$ and CO while increasing the yield of $CO_2$. The reduction in CO production was surprising, as prior reports of processing at reduced hydrogen partial pressures have indicated the opposite result. Without being bound by any particular theory, it is believed that the combination of reduced treat gas ratio and reduced hydrogen partial pressure facilitated the water gas shift reaction. This may have led to increased in situ hydrogen production and a reduction in CO production.

palm/light gas oil, the expected hydrogen consumption should be about 450 scf/bbl to about 520 scf/bbl (about 76 $Nm^3/m^3$ to about 88 $Nm^3/m^3$). A treat gas ratio of about 650 scf/bbl (about 110 $Nm^3/m^3$) was used to hydrotreat the mixed feed in the presence of a CoMo hydrotreatment catalyst. The hydrogen consumption for the palm oil was less than about 800 scf/bbl (about 130 $Nm^3/m^3$). The water yield was substantially reduced relative to the expected water yield from processing at a treat gas ratio greater than about two times the expected hydrogen need.

Example 3 (Comparative)

Co-Processing of Fatty Acid Methyl Ester in the Presence of a Nickel-Containing Catalyst In another experiment, a blend of about 50 wt % of a fatty acid methyl ester (FAME) feed and about 50 wt % of a diluent feed was co-processed under a low treat gas ratio condition at a variety of hydrogen partial pressures. The expected hydrogen consumption for the FAME was believed to be about 1800-2000 scf/bbl (about 300-340 $Nm^3/m^3$), based on literature reports of FAME processing. The diluent feed had been previously hydrotreated, and therefore had a minimal expected hydrogen consumption. The mixed feed was processed in two stages. In a first reactor, a hydrogen flow was introduced with the feed in the presence of a catalyst bed containing about 50 wt % each of a NiMo catalyst and a CoMo catalyst. The reaction temperature for the first reactor was about 520° F. (about 271° C.). The entire effluent from this reactor was cascaded to a second reactor containing the same catalyst volume of only the NiMo catalyst. The reaction temperature in this second reactor was about 610° F. (about 321° C.). The LHSV for the reaction system was about 0.75 $hr^{-1}$. Note that the use of two reactors was a matter of convenience, and this reaction could equally have been performed in a single reactor with a series of stacked beds.

Figure 2:
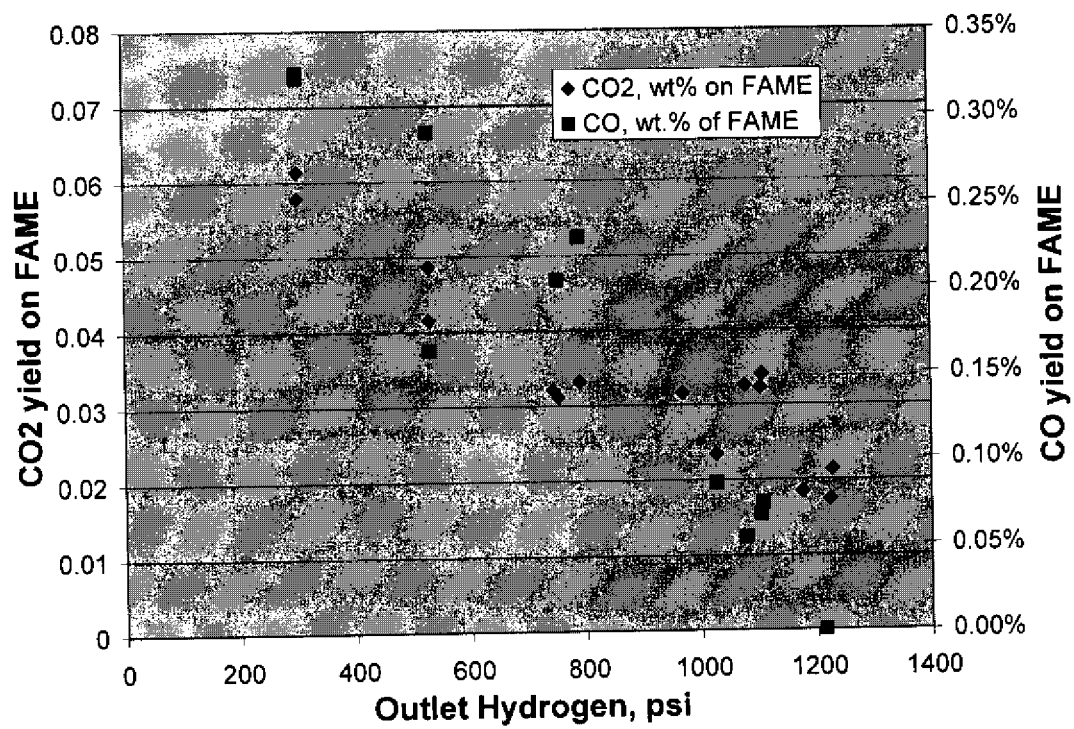
FIG. 2 depicts CO and $CO_2$ production levels from various hydroprocessing experiments.

For each run performed in the reaction system, the treat gas ratio was set at about 1250-1350 scf/bbl (about 210-230 $Nm^3/m^3$) of hydrogen. Based on the 50/50 mixture of fatty acid methyl ester and mineral oil, and the estimate of FAME $H_2$ consumption of about 1800-2000 scf/bbl (about 300-340 $Nm^3/m^3$), the expected hydrogen consumption for the feed was calculated to be between about 900 and 1000 scf/bbl (about 150-170 $Nm^3/m^3$). Thus, the treat gas ratio was less than about 1.5 times the expected hydrogen consumption for the feed. Table 2 and FIG. 2 show results from varying process

TABLE 1

| $H_2$ Treat Gas Ratio scf/bbl ($Nm^3/m^3$) | Product Sulfur wppm | CO Yield wt % | $CO_2$ Yield wt % (wt %) | $H_2O$ Yield wt % (wt %) | Soy $H_2$ consumption scf/bbl ($Nm^3/m^3$) |
|---|---|---|---|---|---|
| 624 | 325 | 0.25 (0.8) | 2.5 (8.4) | 1.3 (4.2) | 968 |
| 1160 | 125 | 0.5 (1.6) | 1.8 (6.1) | 1.7 (5.6) | 1223 |

Example 2

Co-Processing of Palm Oil

At relatively high treat gas ratios, palm oil hydrogen gas consumption has been measured at about 1250-1500 scf/bbl (about 210-250 $Nm^3/m^3$). This value can be reduced by using a relatively low treat gas ratio and a relatively low pressure. Palm oil was co-processed in a feed with about 30 wt % palm oil and about 70 wt % of a light gas oil feed similar to the light gas oil described in Example 1. For this 30/70 feed mixture of pressures. For data associated with this example, any reported hydrogen partial pressures represent a pressure measured at the outlet of the second reactor.

TABLE 2

| Pressure - psig (MPag) | FAME $H_2$ Consumption - scf/bbl ($Nm^3/m^3$) |
|---|---|
| 300 (2.1) | 1770 (298) |
| 800 (5.5) | 1775 (299) |

TABLE 2-continued

| Pressure - psig (MPag) | FAME H$_2$ Consumption - scf/bbl (Nm$^3$/m$^3$) |
|---|---|
| 1000 (6.9) | 1838 (310) |
| 1200 (8.3) | 1922 (324) |

As shown in Table 2, reducing the pressure from 1200 to 300 psig (8.3-2.1 MPag) resulted in only a modest reduction in hydrogen consumption, in spite of the relatively low treat gas ratio. Similarly, FIG. 2 shows that the amount of both CO and CO$_2$ produced increases as the pressure is reduced. This is in contrast to the co-processing examples involving a CoMo supported catalyst, where substantial reductions in apparent hydrogen consumption (as compared to expected hydrogen consumption) were observed at a relatively low pressure, relatively low treat gas ratio condition. Thus, when a NiMo catalyst is included in the catalyst system for initial hydrotreatment of a biocomponent feed, the relatively low pressure and relatively low treat gas ratio condition appears ineffective for substantially reducing the apparent hydrogen consumption.

Example 4

Constructive Example for Processing Biocomponent Feed with Recycle of Feed

A biocomponent feed, such as soybean oil, rapeseed oil, or another vegetable oil is selected. Vegetable oils typically have oxygen contents of about 10 wt % to about 12 wt %. A hydroprocessing method is selected that uses a product recycle rate of about 50 wt %. Thus, the feed entering the reactor will only include about 50 wt % of fresh feed.

A treat gas ratio is selected based on the expected consumption for a feed including about 50 wt % of fresh biocomponent feed. A typical biocomponent feed will consume about 1200 scf/bbl to about 1800 scf/bbl (about 200 Nm$^3$/m$^3$ to about 300 Nm$^3$/m$^3$) of hydrogen, so for a ~50% recycle feed, a treat gas ratio of about 600 scf/bbl to about 900 scf/bbl (about 100 Nm$^3$/m$^3$ to about 150 m$^3$/m$^3$) is selected. This corresponds to a treat gas ratio that roughly matches the expected consumption under a standard, relatively high treat gas ratio condition. The hydrogen partial pressure is between about 175 psig and about 350 psig (about 1.2 MPag to about 2.4 MPag). The space velocity (LHSV) is from about 0.5 hr$^{-1}$ to about 2 hr$^{-1}$. The temperature was from about 300° C. to about 360° C. The feed is exposed to the above hydrotreatment conditions in the presence of a catalyst containing transition metals composed of cobalt and molybdenum on a suitable support.

Under the above conditions, the biocomponent feed will be deoxygenated to a level sufficient for use as a diesel fuel. The hydrogen consumption will be reduced relative to a process using a relatively higher pressure and/or a relatively higher treat gas ratio. Relative to a process using a similar pressure but a relatively higher treat gas ratio, the above process will provide for increased CO$_2$ production and reduced CO and H$_2$O production. This is believed to be due to the water gas shift reaction causing additional hydrogen production, compensating for the reduced amount of hydrogen provided to the reactor. Thus, the apparent hydrogen consumption of the reaction will be reduced by using a combination of a relatively lower pressure and a relatively lower treat gas ratio.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for reducing hydrogen consumption during deoxygenation of a biocomponent feed, comprising:
    determining a hydrogen need of a biocomponent feed; and
    hydrotreating the biocomponent feed under effective deoxygenation conditions to produce a deoxygenated effluent, including a hydrogen partial pressure of about 350 psia or less and a treat gas ratio between about 80% and 120% of the determined hydrogen need,
    wherein the hydrotreatment is performed in the presence of a catalyst having Co and Mo supported on a substrate.

2. The method of claim 1, wherein the effective deoxygenation conditions further comprise a hydrogen partial pressure of about 20 psia to about 350 psia (about 140 kPaa to about 2.4 MPaa), a temperature of about 280° C. to about 380° C., and an LHSV of about 0.3 hr$^{-1}$ to about 4 hr$^{-1}$.

3. The method of claim 2, wherein the treat gas ratio is from about 300 scf/bbl to about 900 scf/bbl (about 50 Nm$^3$/m$^3$ to about 150 Nm$^3$/m$^3$).

4. The method of claim 1, wherein the catalyst consists essentially of Co and Mo supported on a substrate.

5. The method of claim 1, wherein the support comprises silica, alumina, silica-alumina, or titania.

6. The method of claim 1, further comprising recycling a portion of the deoxygenated effluent, wherein the biocomponent feed comprises from about 20 wt % to about 95 wt % recycled feed.

7. The method of claim 6, wherein the biocomponent feed comprises from about 50 wt % to about 90 wt % recycled feed.

8. The method of claim 1, wherein the determined hydrogen need is a stoichiometric hydrodeoxygenation hydrogen need.

9. The method of claim 1, wherein the biocomponent feedstock further comprises about 5 wt % to about 80% by weight of a mineral feed.

10. The method of claim 9, wherein the mineral feed is a diesel boiling range mineral feed.

11. The method of claim 1, wherein the treat gas ratio is about 110% or less of the determined hydrogen need.

12. The method of claim 1, wherein the treat gas ratio is about 100% or less of the determined hydrogen need.

13. The method of claim 1, further comprising: separating the deoxygenated effluent to form a gas phase product and a diesel boiling product; and hydroisomerizing the diesel boiling range product under effective hydroisomerization conditions.

14. The method of claim 1, further comprising: separating the deoxygenated effluent to form a gas phase product and a diesel boiling product; and hydrotreating the diesel boiling range product under effective hydrotreatment conditions.

15. The method of claim 14, further comprising hydroisomerizing the diesel boiling range product under effective hydroisomerization conditions.

16. A method for reducing hydrogen consumption during deoxygenation of a biocomponent feed, comprising:
    determining a hydrogen need of a biocomponent feed; and
    hydrotreating the biocomponent feed under effective deoxygenation conditions to produce a deoxygenated effluent, including a treat gas ratio between about 80% and 120% of the determined hydrogen need, wherein the hydrotreatment is performed in the presence of a catalyst consisting essentially of Mo supported on a substrate.

\* \* \* \* \*